United States Patent
Gonzales et al.

(10) Patent No.: US 8,277,935 B2
(45) Date of Patent: Oct. 2, 2012

(54) CLEANING IMPLEMENT COMPRISING A MODIFIED OPEN-CELL FOAM

(75) Inventors: Denis Alfred Gonzales, Brussels (BE); Iris Bogaerts, Mechelen (BE); Karl Häberle, Speyer (DE); Wolfgang Schrof, Neuleiningen (DE); Volker Schwendemann, Neustadt/Weinstraβe (DE); Stefan Frenzel, Mannheim (DE)

(73) Assignee: The Procter & Gamble Company, Cincinnati, OH (US)

( * ) Notice: Subject to any disclaimer, the term of this patent is extended or adjusted under 35 U.S.C. 154(b) by 484 days.

(21) Appl. No.: 11/641,353

(22) Filed: Dec. 19, 2006

(65) Prior Publication Data

US 2007/0157948 A1 Jul. 12, 2007

(30) Foreign Application Priority Data

Jan. 12, 2006 (EP) .................... 06100286

(51) Int. Cl.
*B32B 5/28* (2006.01)
(52) U.S. Cl. ............... 428/317.9; 428/319.3; 428/319.7; 428/316.6
(58) Field of Classification Search ............ 428/316.6, 428/317.9, 319.3, 319.7; 134/6
See application file for complete search history.

(56) References Cited

U.S. PATENT DOCUMENTS

| | | | |
|---|---|---|---|
| 2,955,056 A * | 10/1960 | Knox | 521/137 |
| 4,008,189 A * | 2/1977 | Van Leuwen et al. | 521/174 |
| 6,503,615 B1 | 1/2003 | Horii et al. | |
| 6,846,480 B2 * | 1/2005 | Smith et al. | 424/70.1 |
| 2005/0136238 A1 | 6/2005 | Lindsay et al. | |
| 2006/0003912 A1 | 1/2006 | Lindsay et al. | |
| 2006/0005338 A1 * | 1/2006 | Ashe et al. | 15/244.4 |
| 2007/0213417 A1 * | 9/2007 | Stork et al. | 521/61 |
| 2008/0194706 A1 * | 8/2008 | Karl et al. | 514/772.3 |

FOREIGN PATENT DOCUMENTS

| | | |
|---|---|---|
| JP | 2004-275666 A | 10/2004 |
| WO | WO 2005103107 A1 * | 11/2005 |
| WO | WO 2006058675 A2 * | 6/2006 |

OTHER PUBLICATIONS

International Search Report received in connection with PCT/IB2007/050098, mailed on May 8, 2007, 3 pages.

* cited by examiner

*Primary Examiner* — Hai Vo
(74) *Attorney, Agent, or Firm* — John T. Dipre; Amy I. Ahn-Roll

(57) ABSTRACT

A cleaning implement comprises a modified open-cell foam with a density in the range from about 5 to about 1,000 kg/m$^3$ and with an average pore diameter in the range from about 1 μm to about 1 mm, comprising an amount in the range from about 1 to about 2,500% by weight, based on the weight of the unmodified open-cell foam, of at least about one water-insoluble polymer (b), selected from polystyrene, styrene copolymers, polybutadiene, butadiene copolymers, polyvinylesters, polyvinylethers, copolymers from (meth)acrylic acid with at least one (meth)acrylate, and polyurethanes, with the proviso that styrene-acrylonitrile-$C_1$-$C_{10}$-alkyl (meth) acrylate terpolymers, styrene-butadiene-n-butyl acrylate terpolymers, and styrene-maleic anhydride copolymers are excluded.

20 Claims, 1 Drawing Sheet

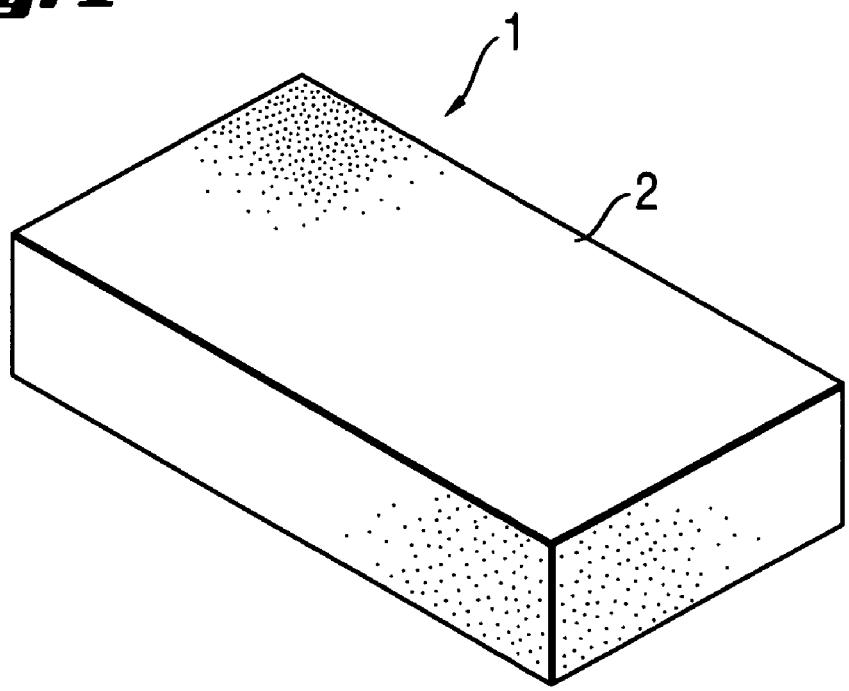
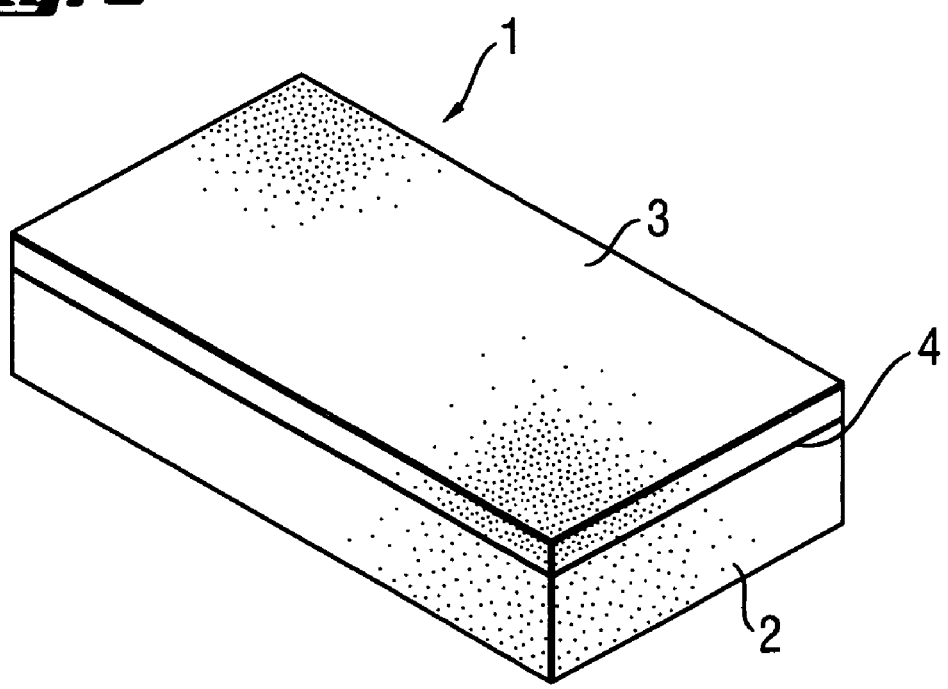

CLEANING IMPLEMENT COMPRISING A MODIFIED OPEN-CELL FOAM

TECHNICAL FIELD

The present invention relates to a cleaning implement comprising a modified open-cell foam.

BACKGROUND OF THE INVENTION

Open-cell foams and in particular melamine-formaldehyde resin foams (also referred to herein as melamine foams) are well known in the art for use in industrial applications, for example, as heat or sound insulating materials as well as for fire protection purposes. Indeed, in the automotive industry, open-cell foams are commonly used to insulate motor compartments and driver cabins of cars and trucks.

Recently, a novel application for such open-cell foams in the area of hard surface cleaning has been discovered. Indeed, cleaning implements of cut or molded pieces of such open-cell foam, and in particular melamine foam, have become popular to remove soils and/or stains from hard surfaces (i.e., cleaning of hard surfaces) such as tiles, walls, floors, sanitary fittings such as sinks, showers, shower curtains, wash basins, WCs, household appliances including, but not limited to, refrigerators, freezers, washing machines, automatic dryers, ovens, microwave ovens, dishwashers and so on. Indeed, melamine foam sponges are currently marketed under the tradename Mr. Clean Magic Eraser®.

It is has been observed that such open-cell foam (and melamine foam in particular) shows good soil and/or stain removal performance when used to clean hard surfaces, on stains/soils such as marks on walls and furniture. Indeed, it has been observed that open-cell foams (and melamine foam in particular) when wetted with an appropriate solvent, such as tap water, removes soils and/or stains from a hard surface when said hard surface is brought into contacted with said wetted modified open-cell foam. By "bringing into contact" it is meant wiping, swiping, rubbing or the like. In order for the open-cell foam (and melamine foam in particular) to optimally remove soils and/or stains from hard surfaces substantial amounts of an appropriate solvent, such as tap water, have to be used. Most commonly, tap water is used by the users of melamine foam when removing soils and/or stains from hard surfaces. When used with water or any other appropriate solvent, the open-cell foam (and melamine foam in particular) comes off as small particles (meaning, the foam crumbles) when brought into contact with a hard surface. Indeed, a milky suspension of small modified open-cell foam (and melamine foam in particular) particles in water is formed.

It has been discovered by consumer research that users of such open-cell foam (and melamine foam in particular)-based implements, when removing soils and/or stains from hard surfaces, are looking for implements that show an improved performance on removal of greasy soap scum soils and neat kitchen dirt (i.e., grease). Indeed, currently open-cell foam-based cleaning implements fail to provide cleaning performance on such soils or only show a very weak cleaning performance on such soils. Furthermore, several cleaning implements made from currently available open-cell foams are found to loose their cleaning action partially or even completely, because of irreversible damage after a relatively short service time, for example after about 10 minutes. Producers of such cleaning implements, for example of wipers, therefore recommend disposal of cleaning materials after an appropriate service time which is generally very brief, e.g. 10 minutes.

It is therefore, an objective of the present invention to provide a cleaning implement based on an open-cell foam and preferably a melamine foam, wherein said implement is capable of (improved) cleaning greasy soap scum soils and neat kitchen dirt (grease) from hard surfaces and at the same time shows excellent durability upon use.

It has now been found that the above objective can be met by the use of a modified open-cell according to the present invention (also referred to herein as inventive foams) to clean hard surfaces. Indeed, the objectives are met by the cleaning implement according to the present invention comprising such modified open-cell foams, the method of cleaning hard surfaces with such a cleaning implement or the method of cleaning hard surfaces with the inventive foams.

SUMMARY OF THE INVENTION

The present invention encompasses a cleaning implement (1) comprising a modified open-cell foam (2) with a density in the range from about 5 to about 1,000 kg/m$^3$ and with an average pore diameter in the range from about 1 µm to about 1 mm, comprising an amount in the range from about 1 to about 2,500% by weight, based on the weight of the unmodified open-cell foam, of at least about one water-insoluble polymer (b), selected from: polystyrene, styrene copolymers, polybutadiene, butadiene copolymers, polyvinylesters, polyvinylethers, copolymers from (meth)acrylic acid with at least one (meth)acrylate, polyurethanes, polyethylene and wax derivatives thereof, polypropylene and wax derivatives thereof, polyethylene-copolymers, polypropylene-copolymers, and ethylene-propylene-diene-copolymers and combinations thereof; with the proviso that styrene-acrylonitrile-$C_1$-$C_{10}$-alkyl (meth)acrylate terpolymers, styrene-butadiene-n-butyl acrylate terpolymers, and styrene-maleic anhydride copolymers are excluded.

The present invention further encompasses a method of cleaning a hard surface with a cleaning implement according to the present invention.

The present invention further encompasses a method of cleaning a hard surface with a modified open-cell foam, wherein said hard surface is contacted with said modified open-cell foam and wherein said modified open-cell foam has a density in the range from about 5 to about 1,000 kg/m$^3$ and an average pore diameter in the range from 1 µm to 1 mm, comprising an amount in the range from about 1 to about 2,500% by weight, based on the weight of the unmodified open-cell foam, of at least about one water-insoluble polymer (b), selected from: polystyrene, styrene copolymers, polybutadiene, butadiene copolymers, polyvinylesters, polyvinylethers, copolymers from (meth)acrylic acid with at least one (meth)acrylate, polyurethanes, polyethylene and wax derivatives thereof, polypropylene and wax derivatives thereof, polyethylene-copolymers, polypropylene-copolymers, and ethylene-propylene-diene-copolymers and combinations thereof; with the proviso that styrene-acrylonitrile-$C_1$-$C_{10}$-alkyl (meth)acrylate terpolymers, styrene-butadiene-n-butyl acrylate terpolymers, and styrene-maleic anhydride copolymers are excluded.

BRIEF DESCRIPTION OF THE DRAWINGS

FIG. 1 is a perspective view of a cleaning implement according to a first embodiment of the present invention.

FIG. 2 is a perspective view of a cleaning implement according to a second embodiment of the present invention.

DESCRIPTION OF REFERENCE NUMERALS

1: Cleaning implement
2: Modified open-cell foam layer
3: Layer of a second foam.
4: Line indicating the separation of the two layers

DETAILED DESCRIPTION OF THE INVENTION

This application is subject to a joint development agreement between The Procter and Gamble Company and BASF.
Cleaning Implement The cleaning implement (1) herein comprises a modified open-cell foam as described herein below.

By a "cleaning implement" it is meant herein an article of manufacture of any suitable shape and/or size and/or volume suitable for cleaning, i.e., removing spots and/ore stains from hard surfaces. In a highly preferred embodiment according to the present invention, the cleaning implement herein is in a shape and/or size and/or volume suitable for use by a consumer to clean hard surfaces therewith. Examples of cleaning implements are wipers, brushes, cleaning cloths or cleaning granules.

Suitable shapes of the cleaning implements (1), such as a wiper, herein may be selected from the group consisting of: cube shape, rectangular shape, pyramid shape, cylindrical shape, cone shape, pencil eraser shape, cuboid shape, tetrahedron shape; sphere shape; globular shape; and ellipsoid shape. Preferably, said cleaning implement has a shape selected from the group consisting of: cube shape, rectangular shape, pencil eraser shape, and cuboid shape.

Suitable volumes of the cleaning implements herein may be from about 1 $cm^3$ to about 10,000 $cm^3$, preferably from about 10 $cm^3$ to about 1,000 $cm^3$, more preferably from about 150 $cm^3$ to about 250 $cm^3$.

In a highly preferred embodiment herein, the cleaning implement (1) herein has a cuboid shape defined by three groups of parallel and equal length sides, referred to as a, b and c, wherein a ranges from about 2 cm to about 20 cm, preferably about 4 cm to about 8 cm, b ranges from about 2 cm to about 20 cm preferably about 8 cm to about 15 cm, and c ranges from about 1.5 cm to about 5 cm, preferably about 2 cm to about 4 cm.

In a preferred embodiment, the thickness of said modified open-cell foam (2) layer is from about 5 mm to about 100 mm, preferably from about 7 mm to about 50 mm, more preferably about 10 mm to about 50 mm even more preferably from about 15 mm to about 50 mm, still more preferably from about 20 mm to about 40 mm.

The cleaning implement (1) of a first embodiment of the present invention as shown in FIG. 1 comprises a single layer (2) of modified open-cell foam.

In a preferred embodiment according to the present invention the cleaning implements herein may comprise additional layers of material. Preferably, in the cleaning implement herein said modified open-cell foam (2) forms a first layer and said cleaning implement additionally comprises a second layer of material. Even more preferably, said second layer of material is a second foam layer (3) made of a second foam material as discussed herein below. Such a cleaning implement according to this preferred embodiment is shown in FIG. 2.

The layers of modified open-cell foam (2) and second foam (3) may be arranged in said cleaning implement in any way suitable. In a preferred embodiment the layers of modified open-cell foam (2) and second foam (3) are arranged parallel to at least one side, preferably two opposite sides, of the cleaning implement. However, the cleaning implement may also have an irregular shape. Indeed, the thickness of the layers may be constant or vary throughout the cleaning implement. The separation line (4) between the two layers may form a straight line or may form a bend or be completely irregular. In addition, the separation plane of the layers may be in the center of cleaning implement, dividing the implement in two equal parts, or may be in the upper or lower part of the implement. In addition, the cleaning implement may be in the shape of a sphere or a globule or an ellipsoid with the separation plane of the layers forming a spherical segment or one of the layers, preferably the layer of a second foam here, forming a sphere in a sphere (similar to the layers of an onion).

In this highly preferred embodiment, wherein the cleaning implement (1) herein has a cuboid shape, the line indicating the separation (4) of the two layers (or the surface areas where the two layers are joined together) of the implement is preferably substantially parallel (preferably parallel) to the side of the cuboid shaped implement having the largest surface area (as shown in FIG. 2).

In another highly preferred embodiment herein the cleaning implement herein is in the shape of a pencil eraser. By "shape of a pencil eraser" it is meant herein a voluminous body having six walls, wherein three pairs of parallel and equally shaped and sized walls exist and wherein one pair of walls are in the shape of a parallelogram and the remaining two pairs of walls are of rectangular shape. In this preferred embodiment, wherein the cleaning implement herein has the shape of a pencil eraser, the line indicating the separation of the two layers (or the surface areas where the two layers are joined together) of the implement is preferably substantially parallel (preferably parallel) to the side of implement in the shape of a pencil eraser having the largest surface area.

In order to obtain suitable cleaning implements according to a preferred embodiment of the present invention present invention, the modified open-cell foam layer (2) and the second layer of a second foam (3) have to be attached to each other. This attachment can be achieved by any attachment means suitable for joining the two layers. The attachment may be either a permanent attachment (wherein the two layers cannot be separated without inflicting substantial damage to the layers) or temporary attachment (wherein the two layers may be separated without inflicting substantial damage to the layers). Suitable attachment means providing a permanent attachment are selected from the group consisting of: foam flame laminating the two layers together; use of a permanent adhesive; sewing the two layers together; and needle-punching the two layers together; and combinations thereof. Suitable attachment means providing a temporary attachment are selected from the group consisting of: a weak adhesive; Velcro; and a water-based, water-soluble coating or adhesive; and combinations thereof.

In a preferred embodiment here, the attachment of layers herein is a permanent attachment.

Foam flame lamination is a continuous process that can adhere foams and additional materials, if any, to one or both sides of a foam in a single pass. The process of flame lamination involves the passing of a first foam (either the modified open-cell foam herein or the second foam herein) over an open flame, which creates a thin layer of molten foam/polymer. A second foam (either the second foam herein or the modified open-cell foam herein, depending on the first step) is pressed against the first foam while it is still in the molten state. Foams and additional material, if any, can be adhered to one or both sides of the foam in a single pass. Furthermore, additional passes are optional. The strength of the bond depends upon the foams and additional material, if any, selected and the processing conditions (i.e., gas type, flame height and spread, foam burn-off and nip pressure).

The cleaning implement according to the present invention may contain more than two layers, wherein said additional layers, if any, may be of the same or similar materials as the modified open-cell foam or said second foam, or may be made of another material having similar properties as said second foam or different properties therefrom. Indeed, the cleaning implement herein may be in a so-called sandwich configuration, wherein three layers are present. In a preferred embodiment, wherein the cleaning implement herein is in a sandwich configuration, the middle layer may be said second foam and at least one of the two outer layers is a modified open-cell foam with the second outer layer being either a modified open-cell foam or another material providing other feature, such as abrasiveness or increased rigidity. In a highly preferred embodiment according to the present invention the cleaning implement herein comprises two outer layers of said modified open-cell foam (a) and an inner layer, preferably of a second foam material, as discussed herein below.

The layers of the cleaning implement according to the present invention may cover each other either partially or fully. By a "partial coverage" it is meant that at least one of the layers overlaps the other layer (or other layers, if any) and is not fully covered by said other layer (or other layers, if any). By a "full coverage" it is meant that the layers of the cleaning implement do fully cover each other and that none of the layers substantially overlap the other layer (or other layers, if any).

The ratio of said modified open-cell foam to said second foam in the cleaning implement according to the present invention is preferably from about 20:1 to about 1:20 by volume, more preferable from about 10:1 to about 1:10 by volume, even more preferably about 5:1 to about 1:1, still more preferably about 5:1 to about 2:1, and most preferably from about 4:1 to about 3:1 by volume.

In order to obtain suitable cleaning implements according to the present invention, the modified open-cell foam- and second foam-raw materials may have to be modified in shape and/or size. This modification can be done by any means known to those skilled in the art. Suitable means of modifying the shape and/or size of melamine foam- and second foam-raw materials may be selected from the group consisting of: cutting, breaking, and tearing, and combinations thereof.

Modified Open-Cell Foam

The cleaning implement (1) herein comprises a modified open-cell foam (2). Such modified open-cell foams are also termed inventive foams hereinafter.

Inventive modified foams are open-cell foams, i.e. foams in which at least about 50% of all of the lamellae are open, preferably from about 60 to about 100%, and particularly preferably from about 65 to about 99.9%, determined to DIN ISO 4590.

The inventive modified foams are preferably rigid foams, which for the purposes of the present invention are foams whose compressive strength, determined to DIN 53577, is 1 kPa or above at 40% compression.

Inventive modified foams have a density in the range from about 5 to about 1000 kg/m$^3$, preferably from about 6 to about 500 kg/m$^3$ and particularly preferably in the range from about 7 to about 300 kg/m$^3$.

Inventive modified foams have an average pore diameter (number-average) in the range from about 1 µm to about 1 mm, preferably from about 50 to about 500 µm, determined via evaluation of micrographs of sections.

Inventive modified foams preferably comprise an amount in the range from about 1 to about 2,500% by weight, preferably from about 20 to about 500% by weight, based on the weight of the corresponding unmodified foam (a), of at least about one water-insoluble polymer (b), selected from polystyrene, styrene copolymers, polybutadiene, butadiene copolymers, polyvinylesters, polyvinylethers, copolymers from (meth)acrylic acid with at least one (meth)acrylate, polyurethanes, polyethylene and wax derivatives thereof, polypropylene and wax derivatives thereof, polyethylene-copolymers, polypropylene-copolymers, and ethylene-propylene-diene-copolymers and combinations thereof, with the proviso that styrene-acrylonitrile-$C_1$-$C_{10}$-alkyl (meth)acrylate terpolymers, styrene-butadiene-n-butyl acrylate terpolymers, and styrene-maleic anhydride copolymers are excluded.

In the context of the present invention, hydrolyzed styrene-maleic anhydride copolymers will be summarized under the term styrene-maleic anhydride copolymers.

Water-insoluble polymers (b), selected from polystyrene, styrene copolymers, polybutadiene, butadiene copolymers, polyvinylesters, polyvinylethers, copolymers from (meth)acrylic acid with at least one (meth)acrylate, polyurethanes, polyethylene and wax derivatives thereof, polypropylene and wax derivatives thereof, polyethylene-copolymers, polypropylene-copolymers, and ethylene-propylene-diene-copolymers and combinations thereof, excluding styrene-acrylonitrile-$C_1$-$C_{10}$-alkyl (meth)acrylate terpolymers, styrene-butadiene-n-butyl acrylate terpolymers, and styrene-maleic anhydride copolymers, will be termed polymers (b) in context with the present invention.

In one embodiment of the present invention, polymers (b) have a melting point above about 25° C., preferably above about 50° C., determined via DSC.

Polymers (b) may have a molecular mass $M_n$ in the range from about 1,000 to about 1,000,000 g/mol, preferably from about 1,500 to about 500,000 g/mol, particularly preferably from about 2,000 to about 200,000 g/mol, and very particularly preferably up to about 50,000 g/mol, determined, e.g., by gel permeation chromatography (GPC).

Polymers (b) are water-insoluble polymers. In the context of this invention, water-insoluble polymers are polymers with a solubility of less than about 1 g/l in water at a pH value of 7, determined at 25° C.

In one embodiment of the present reaction, polymer (b) is water-dispersed or emulsified and can be self-dispersing.

Preferred examples for polymers (b) are polyethylene and wax derivatives thereof, polypropylene and wax derivatives thereof, co-polymers of polyethylene or polypropylene polystyrene, copolymers of polystyrene with acrylonitrile, in particular block copolymers and graft copolymers, polybutadiene, copolymers of styrene with butadiene, in particular block copolymers and graft copolymers, copolymers of styrene with butadiene and acrylonitrile, copolymers of butadiene with isoprene and/or chloroprene, polyvinylesters such as polyvinylacetate, polyvinylethers, such as polymers from vinyl-$C_1$-$C_{20}$-alkylethers, copolymers, in particular random copolymers of (meth)acrylic acid with at least one (meth)acrylate, said copolymers being ethylene-free copolymers. (Meth) acrylates can be chosen from compounds of general formula I

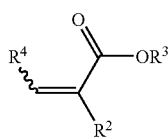

R² selected from hydrogen,
  $C_1$-$C_{10}$-alkyl, such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, iso-amyl, n-hexyl, isohexyl, sec-hexyl, n-heptyl, n-octyl, n-nonyl, n-decyl; particularly preferably $C_1$-$C_4$-alkyl, such as methyl, ethyl, n-propyl, isopropyl, n-butyl, isobutyl, sec-butyl, and tert-butyl;
R³ selected from $C_1$-$C_{10}$-alkyl, such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, n-octyl, n-nonyl, n-decyl; particularly preferably $C_1$-$C_4$-alkyl, such as methyl, ethyl, n-propyl, isopropyl, n-butyl, isobutyl, sec-butyl, and tert-butyl,
  $C_2$-$C_{10}$-hydroxyalkyl, in particular ω-hydroxy-$C_2$-$C_{10}$-alkyl, preferably ω-hydroxy-$C_2$-$C_{10}$-alkyl, such as 3-hydroxypropyl, 4-hydroxybutyl, 6-hydroxyhexyl and most preferably 2-hydroxyethyl;
R⁴ selected from hydrogen,
  $C_1$-$C_{10}$-alkyl, such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, iso-amyl, n-hexyl, isohexyl, sec-hexyl, n-heptyl, n-octyl, n-nonyl, n-decyl; particularly preferably $C_1$-$C_4$-alkyl, such as methyl, ethyl, n-propyl, isopropyl, n-butyl, isobutyl, sec-butyl, and tert-butyl.

Preferred examples of compounds of general formula 1 are ethyl acrylate, n-butyl acrylate, 2-ethylhexyl acrylate, and methyl methacrylate.

Preferred copolymers of (meth)acrylic acid with at least one (meth)acrylate are random copolymers made by emulsion copolymerization of at least one comonomer termed principal comonomer and being selected from $C_1$-$C_{10}$-(meth)acrylates, making up to at least about 50% by weight, preferably at least about 67% by weight and even more preferably at least about 80% by weight of the respective copolymer, about 0.1 to about 20% by weight of (meth)acrylic acid, and up to about 20% by weight, preferably up to about 15% by weight of at least one further comonomer, said further comonomer being selected from a further $C_1$-$C_{10}$-(meth)acrylate which is not equal to the prinicipal comonomer, preferably $C_2$-$C_{10}$-hydroxyalkyl(meth)-acrylate, $C_1$-$C_{20}$-vinylesters such as vinyl stearate, vinyl laurate, vinyl acetate or vinyl propanoate, vinylaromatic compounds such as α-methyl styrene and in particular styrene, vinyl halide such as vinyl chloride, $C_1$-$C_{20}$-vinylethers such as vinyl ethyl ether.

In one embodiment of the present invention, said water-insoluble polymer (b) has thermoplastic properties.

In one embodiment of the present invention, said water-insoluble polymer (b) has elastomeric properties.

Particularly preferred examples for polymers (b) are polyurethanes, especially self-dispersing polyurethanes. In another highly preferred embodiment, polymer (b) is an elastomeric ethylene-propylene co-polymer.

In one embodiment of the present invention, polyurethanes are obtainable via reaction of at least one diol such as glycol, 1,4-butandiol, or 1,6-hexandiol, polyesterdiols, polyetherdiols, with at least one diisocyanate and, if appropriate, one or more other compounds capable of reaction with isocyanate groups, such as aminoalcohols, diamines, or thioglycol.

In a preferred embodiment of the present invention, polyurethanes are obtainable via reaction of
(A) at least one diol, preferably selected from polyetherdiols and polyesterdiols,
(B) at least one diisocyanate,
(C) if appropriate, other compounds capable of reaction with isocyanate groups or carrying one or more isocyanate groups,
(D) if desired, further, polyfunctional compounds which are different than compounds (A) to (C) and contain reactive groups which are alcoholic hydroxyl groups, primary or secondary amino groups or isocyanate groups, and
(E) if desired, monofunctional compounds which are different than the compounds (A) to (D) and which have a reactive group which is an alcoholic hydroxyl group, a primary or secondary amino group or an isocyanate group.

In a more preferred embodiment of the present invention, polyurethanes are obtainable via reaction of
(A) at least one diol, preferably selected from polyetherdiols and polyesterdiols,
(B) at least one diisocyanate,
(C) at least one compound, having at least one isocyanate group or at least one group which is reactive toward isocyanate groups, said monomers further carrying at least one hydrophilic group or one potentially hydrophilic group which renders the polyurethane dispersible in water,
(D) if desired, further, polyfunctional compounds which are different than compounds (A) to (C) and contain reactive groups which are alcoholic hydroxyl groups, primary or secondary amino groups or isocyanate groups, and
(E) if desired, monofunctional compounds which are different than the compounds (A) to (D) and which have a reactive group which is an alcoholic hydroxyl group, a primary or secondary amino group or an isocyanate group.

Diols (A) can be selected from aromatic and preferably aliphatic diols. Examples of preferred aliphatic diols include ethylene glycol, propane-1,2-diol, propane-1,3-diol, butane-1,3-diol, butene-1,4-diol, butyne-1,4-diol, pentane-1,5-diol, neopentyl glycol, bis(hydroxymethyl)cyclohexanes such as 1,4-bis(hydroxymethyl)-cyclohexane, 2-methylpropane-1,3-diol, methylpentane diols, and also diethylene glycol, triethylene glycol, tetraethylene glycol, polyethylene glycol, dipropylene glycol, polypropylene glycol, and dibutylene glycol and polybutylene glycols. Preferred diols are of the general formula HO—$(CH_2)_x$—OH, in which x is a number from 1 to 20, preferably an even number from 2 to 20. Examples thereof are ethylene glycol, butane-1,4-diol, pentane-1,5-diol, hexane-1,6-diol, octane-1,8-diol, and dodecane-1,12-diol. Preferred is furthermore neopentyl glycol.

Polyetherdiols are obtainable in particular by polymerizing ethylene oxide, propylene oxide, butylene oxide, tetrahydrofuran, styrene oxide or epichlorohydrin with itself, in the presence for example of BF$_3$, or by subjecting these compounds, alone or in a mixture or in succession, to addition reaction with starter components containing reactive hydrogen atoms, such as alcohols or amines, e.g., water, ethylene glycol, propane-1,2-diol, propane-1,3-diol, 2,2-bis(4-hydroxyphenyl)propane or aniline.

Preferred examples of polyetherdiols are diethyleneglycol, dipropyleneglycol, triethyleneglycol, tripropyleneglycol, tetraethyleneglycol, tetrapropyleneglycol, polyethyleneglycols with a molecular mass $M_n$ in the range of about 150 g/mol up to about 5,000 g/mol, polypropyleneglycols with a molecular mass $M_n$ in the range of about 180 g/mol up to about 5,000 g/mol, furthermore poly-tetrahydrofurane with a molecular mass $M_n$ in the range of about 250 g/mol up to about 5,000 g/mol.

Polyester diols are known per se, see, e.g., *Ullmanns Encyklopädie der technischen Chemie*, 4$^{th}$ edition, Thieme Verlag, volume 19, pp. 62 to 65 (incorporated herein by reference). It is preferred to use polyesterdiols obtained by reacting on or more diols with one or more dibasic carboxylic acids. Instead of the respective free dicarboxylic acids it is also possible to use the corresponding dicarboxylic anhydrides or corresponding carboxylic esters of lower alcohols such as methanol or ethanol or mixtures thereof to prepare polyester diols. Dicarboxylic acids can be aliphatic, cycloaliphatic, araliphatic, aromatic or heterocyclic and where appropriate may be substituted, by halogen atoms for example, and/or unsaturated. Examples that may be mentioned include the following: suberic acid, azelaic acid, phthalic acid, isophthalic acid, terephthalic acid, phthalic anhydride, tetrahydrophthalic anhydride, hexahydrophthalic anhydride, tetrachlorophthalic anhydride, endomethylenetetrahydrophthalic anhydride, glutaric anhydride, maleic acid, maleic anhydride, fumaric acid, and dimeric fatty acids. Preference is given to dicarboxylic acids of the general formula HOOC—(CH$_2$)$_y$—COOH, in which y is a number from about 1 to about 20, preferably an even number from about 2 to about 20, examples being succinic acid, adipic acid, sebacic acid, and dodecanedicarboxylic acid.

Where appropriate it is also possible to use lactone-based polyesterdiols, which are homopolymers or copolymers of lactones, preferably hydroxyl-terminated adducts of lactones with suitable difunctional starter molecules. Suitable lactones include preferably those derived from compounds of the general formula HO—(CH$_2$)$_z$—COOH in which z is a number from about 1 to about 20 and one hydrogen atom of a methylene unit may also be substituted by a about C$_1$ to about C$_4$ alkyl radical. Examples are ε-caprolactone, β-propiolactone, γ-butyrolactone and/or methyl-γ-caprolactone and also mixtures thereof. Examples of suitable starter components are the diols specified above as a synthesis component for the polyesterdiols. The corresponding polyesterdiols based on ε-caprolactone are particularly preferred.

Also suitable, furthermore, are polycarbonatediols, such as may be obtained, for example, by reacting phosgene with an excess of any of the diols mentioned above. Said polycarbonatediols are subsequently included under term polyesterdiols unless otherwise noted.

Preferred examples of polyesterdiols are hydroxyl group terminated polycondensates of at least one dicarboxylic acid with at least one diol, preferably at least one aromatic or aliphatic dicarboxylic acid such as phthalic acid, isophthalic acid, or terephthalic acid, succinic acid, glutaric acid, adipic acid, sebacic acid (HOOC—(CH$_2$)$_8$—COOH), with at least about one diol such as ethylene glycol, 1,4-butanediol, 1,12-dodecanediol, neopentyl glycol, 1,4-dihydroxymethylcyclohexanol, or 1,6-hexanediol. Preferred polyesterdiols have a molecular weight $M_n$ in the range of about 250 g/mol up to about 5,000 g/mol, preferably up to about 3,000 g/mol.

Preferred diisocyanates (B) are selected from araliphatic and aromatic and preferably aliphatic and cycloaliphatic polyfunctional compounds known per se and having two or more isocyanate groups.

Examples of diisocyanates (B) include tetramethylene diisocyanate, hexamethylene diisocyanate, dodecamethylene diisocyanate, 1,4-diisocyanatocyclohexane, 1-isocyanato-3,5,5-trimethyl-5-isocyanatomethylcyclohexane (IPDI), 2,2-bis(4-isocyanatocyclohexyl)propane, trimethylhexane diisocyanate, 1,4-diisocyanatobenzene, 2,4-diisocyanatotoluene, 2,6-diisocyanatotoluene, 4,4'-diisocyanatodiphenylmethane, 2,4'-diisocyanato-diphenylmethane, p-xylylene diisocyanate, tetramethylxylylene diisocyanate (TMXDI), the isomers of bis(4-isocyanatocyclohexyl)methane (HMDI) such as the trans/trans, the cis/cis, and the cis/trans isomer, and mixtures of compounds mentioned above.

Examples of preferred aliphatic diisocyanates are about C$_4$-C$_{12}$-alkylene diisocyanates, preferably hexamethylene 1,6-diisocyanate; cycloaliphatic diisocyanates such as cyclohexane 1,3- and 1,4-diisocyanate and any mixtures of these isomers, 1-isocyanato-3,3,5-trimethyl-5-isocyanatomethyl-cyclohexane (isophorone diisocyanate, IPDI), and the isomers of bis(4-isocyanatocyclohexyl)methane (HMDI) such as the trans/trans, the cis/cis, and the cis/trans isomer.

Examples for preferred aromatic diisocyanates are tolylene 2,4- and 2,6-diisocyanate and corresponding isomer mixtures, diphenylmethane 4,4'-, 2,4'- and 2,2'-diisocyanate and corresponding isomer mixtures, mixtures of diphenylmethane 4,4'- and 2,4'-diisocyanates, polyphenyl polymethylene polyisocyanates, mixtures of diphenylmethane 4,4'-, 2,4'- and 2,2'-diisocyanates and polyphenyl polymethylene polyisocyanates (crude MDI), and mixtures of crude MDI with toluylene diisocyanates.

Diisocyanates (B) can be used individually or in the form of mixtures.

Examples for other compounds capable of reaction with isocyanate groups (C), in the context of the present invention also referred to as compounds (C), can be selected from diamines, such as primary diamines or secondary diamines or diamines with one NH$_2$-group and one NHR$^6$-group, R$^6$ being selected from linear C$_1$-C$_4$-alkyl and phenyl, and from aminoalcohols such as ethanolamine, N,N-diethanolamine, N-methylethanolamine, and from thioglycol.

Compounds (C) are preferably those that have at least two functional groups capable of reaction with isocyanate groups, such as hydroxyl groups and primary or secondary amino groups, and an additional group such as a carboxyl group or a sulfonate group. Examples for preferred compounds (C) are 1,1-dihydroxymethylpropionic acid, 1,1-dihydroxymethyl acetic acid, 1,1-dihydroxymethylbutyric acid.

Further preferred compounds (C) include aminocarboxylic acids such as lysine, β-alanine or the adducts of aliphatic diprimary diamines with α,β-unsaturated carboxylic or sulphonic acids that are specified in DE-A 20 34 479 (incorporated herein by reference).

Such compounds conform, for example, to the formula (C.1)

in which
Y$^1$ and Y$^2$ independently of one another are a about C$_1$ to about C$_6$ alkanediyl unit, preferably ethylene,
and X is COOH or SO$_3$H.
Particularly preferred compounds of the formula (C.1) are N-(2-aminoethyl)-2-aminoethanecarboxylic acid and also N-(2-aminoethyl)-2-aminoethanesulfonic acid and the corresponding alkali metal salts, with Na being a particularly preferred counterion.

Particular preference is also given to adducts of the above-mentioned aliphatic diprimary diamines with 2-acrylamido-2-methylpropanesulfonic acid, such as are described in, for example, DE-B 1 954 090 (incorporated herein by reference).

In a preferred embodiment of the present reaction, mixtures of at least two different diols (A) are used for synthesis of polyurethane. From said two diols (A), one diol ($A_1$) can have a molecular weight $M_n$ in the range from about 500 to about 5,000 g/mol, and the other diol ($A_2$) can have a molecular weight $M_n$ in the range from about 60 to about 500 g/mol, provided that the diols ($A_1$) and ($A_2$) are different.

Where appropriate it is also possible to use polyhydroxyolefins, preferably those having two terminal hydroxyl groups, e.g., α,ω-dihydroxypolybutadiene, α,ω-dihydroxypolymethacrylic esters or α,ω-dihydroxypolyacrylic esters as compound (C). Such compounds are known from, for example, EP-A 0 622 378 (incorporated herein by reference). Further suitable compounds (C) are polyacetals, polysiloxanes, and alkyd resins.

Polyfunctional compounds (D) which are different than the compounds (A) to (C) and which are also, where appropriate, constituents of polyurethane, can serve generally for crosslinking or chain extension.

In general polyfunctional compounds (D) are chosen from nonphenolic alcohols with a functionality of more than two, amines with two or more primary and/or secondary amino groups, and compounds which carry not only one or more alcoholic hydroxyl groups but also one or more primary and/or secondary amino groups.

Alcohols with a functionality of more than two that can be used to set a certain degree of branching or crosslinking are, for example, trimethylolpropane, glycerol or sucrose.

Other polyfunctional compounds (D) which come into consideration are monoalcohols which as well as the hydroxyl group carry a further isocyanate-reactive group, such as monoalcohols containing one or more primary and/or secondary amino groups, an example being monoethanolamine. Polyamines having two or more primary and/or secondary amino groups are used in particular as polyfunctional compounds (D) when chain extension or crosslinking is to take place in the presence of water, since amines generally react faster with isocyanates than do alcohols or water. This is frequently necessary when the desire is for aqueous dispersions of crosslinked polyurethanes or of polyurethanes having a high molar weight. In such cases a procedure is followed in which isocyanate-containing prepolymers are prepared, are dispersed rapidly in water, and then are chain-extended or crosslinked by adding compounds having two or more isocyanate-reactive amino groups.

Polyamines suitable for this purpose are generally polyfunctional amines from the molar weight range from about 32 to about 500 g/mol, preferably from about 60 to about 300 g/mol, which contain at least two amino groups selected from the group consisting of primary and secondary amino groups. Examples thereof are diamines such as diaminoethane, diaminopropanes, diaminobutanes, diaminohexanes, piperazine, 2,5-dimethylpiperazine, amino-3-aminomethyl-3,5,5-trimethylcyclohexane (isophoronediamine, IPDA), 4,4'-diaminodicyclohexylmethane, 1,4-diaminocyclohexane, aminoethylethanolamine, hydrazine, hydrazine hydrate or triamines such as diethylenetriamine or 1,8-diamino-4-aminomethyloctane.

Polyamines may also be employed in blocked form, e.g., in the form of the corresponding ketimines (see CA-A 1,129, 128, for example—incorporated herein by reference), ketazines (see U.S. Pat. No. 4,269,748, for example—incorporated herein by reference) or amine salts (see U.S. Pat. No. 4,292,226, incorporated herein by reference). Oxazolidines as well, as used for example in U.S. Pat. No. 4,192,937, incorporated herein by reference, constitute blocked polyamines which, for the preparation of the polyurethanes of the invention, can be used for chain extending prepolymers. Where such a blocked polyamine is used, it is generally mixed with prepolymer in the absence of water to form a mixture that is subsequently combined with the dispersion water or with part of the dispersion water, such that the corresponding polyamine is released by hydrolysis.

It is preferred to use mixtures of diamines and triamines, more preferably mixtures of isophoronediamine (IPDA) and diethylenetriamine (DETA).

Polyurethanes can comprise preferably from about 1 to about 30 mol %, more preferably from about 4 to about 25 mol-%, based on the total amount of components (A) and (D), of a polyamine having at least two isocyanate-reactive amino groups, as polyfunctional compound (D).

For the same purpose it is also possible as polyfunctional compounds (D) to use isocyanates having a functionality of more than two. Examples of commercially customary compounds include the isocyanurate or the biuret of hexamethylene diisocyanate.

Monofunctional compounds (E), which are used additionally if desired, are selected from monoisocyanates, monoalcohols, and mono-primary and mono-secondary amines. Their proportion is in general not more than about 10 mol-%, based on the total molar amount of the compounds (A) to (D). Said monofunctional compounds (E) can carry further functional groups such as olefinic groups or carbonyl groups, and serve to introduce functional groups into the polyurethane that allow the dispersing or the crosslinking or further polymer-analogous reaction of the polyurethane. Monofunctional compounds (E) suitable for this purpose are those such as isopropenyl-α,α-dimethylbenzyl isocyanate (TMI) and esters of acrylic or methacrylic acid such as hydroxyethyl acrylate or hydroxyethyl methacrylate.

Polyurethanes having a particularly good profile of properties are obtained in particular when substantially only aliphatic diisocyanates, cycloaliphatic diisocyanates or araliphatic diisocyanates are used as diisocyanates (B).

Said compound combination is outstandingly supplemented, as component (C), by alkali metal salts of diaminosulfonic acids, especially by N-(2-aminoethyl)-2-aminoethanecarboxylic acid and/or its corresponding alkali metal salts, the Na salt being the most suitable, and by a mixture of DETA/IPDA as component (D).

In one embodiment of the present reaction, the compounds (A) to (E) and also their respective molar amounts are selected such that the ratio α:β, where α is the sum of the molar amount of hydroxyl groups and the molar amount of the functional groups which are able to react with isocyanates in an addition reaction, and β is the molar amount of isocyanate groups is from about 0.5:1 to about 2:1, preferably from about 0.8:1 to about 1.5, more preferably from about 0.9:1 to about 1.2:1. With very particular preference the ratio α:β is as close as possible to about 1:1.

In one embodiment of the present invention, inventive open-cell modified foams are those based on synthetic organic foam, for example based on organic unmodified foams, such as foams based on polyurethane resins or foams based on phenol-formaldehyde resins or preferably on aminoplastic foams, for example comprising urea-formaldehyde resins, or else, and in particular foams based on aminoplastic foams or even more particular based on aminoplastic-formaldehyde resins, in particular on melamine-formaldehyde resins, and for the purposes of the present invention foams based on melamine-formaldehyde resins are also termed melamine foams.

This means that inventive foams are produced from open-cell foams (a) which comprise synthetic organic materials, preferably polyurethane foams or phenol-formaldehyde foams or particularly aminoplastic foams, and in particular melamine foams.

In one embodiment of the present invention, open-cell foam (a) is selected from aminoplastic foams which have been produced by foaming a precondensate of at least one organic di- or triamine with at least on carbonyl compound.

After the inventive contact, inventive modified foams preferably comprise, according to the invention, an amount in the range from about 1 to about 2,500% by weight, preferably from about 10 to about 1,000% by weight, based on the weight of the corresponding unmodified open-cell foam (a), of at least one polymer (b).

Modified Open-Cell Foams Production Process

Modified open-cell foams are obtained as discussed herein below. The modified open-cell foams production process comprises contacting
(a) open-cell foams with a density in the range from about 5 to about 500 kg/m$^3$ and with an average pore diameter in the range from about 1 µm to about 1 mm
(b) into contact with at least one polymer selected from: polystyrene, styrene copolymers, polybutadiene, butadiene copolymers, polyvinylesters, polyvinylethers, copolymers from (meth)acrylic acid with at least one (meth)acrylate, polyurethane, polyethylene and wax derivatives thereof, polypropylene and wax derivatives thereof, polyethylene-copolymers, polypropylene-copolymers, and ethylene-propylene-diene-copolymers and combinations thereof with the proviso that styrene-acrylonitrile-$C_1$-$C_{10}$-alkyl (meth)acrylate terpolymers, styrene-butadiene-n-butyl acrylate terpolymers, and styrene-maleic anhydride copolymers are excluded.

For the purposes of the present invention, the unmodified open-cell foams (a) used to carry out the process for obtaining the modified open-cell foams are very generally also termed unmodified foams (a) or open-cell foams (a). The unmodified open-cell foams (a) used to carry out the process for obtaining the modified open-cell foams are described in more detail below.

To carry out the modified open-cell foams production process, the starting material used comprises open-cell foams (a), in particular foams in which at least about 50% of all of the lamellae are open, preferably from about 60 to about 100%, and particularly preferably from about 65 to about 99.9%, determined to DIN ISO 4590. Said cells can be shaped, e.g. like channels.

Open-cell foams (a) are preferably rigid foams, which for the purposes of the present invention are foams whose compressive strength, determined to DIN 53577, is about 1 kPa or more at about 40% compression.

Open-cell foams (a) have a density in the range from about 5 to about 500 kg/m$^3$, preferably from about 6 to about 300 kg/m$^3$, and particularly preferably in the range from about 7 to about 300 kg/m$^3$.

Open-cell foams (a) have an average pore diameter (number-average) in the range from about 1 µm to about 1 mm, preferably from about 50 to about 500 µm, determined via evaluation of micrographs of sections.

In one embodiment of the present invention, open-cell foams (a) may have at most about 20, preferably at most about 15, and particularly preferably at most about 10 pores per m$^2$ of diameter in the range up to about 20 mm. The remaining pores usually have a smaller diameter.

In one embodiment of the present invention, open-cell foams (a) have a BET surface area in the range from about 0.1 to about 50 m$^2$/g, preferably from about 0.5 to about 20 m$^2$/g, determined to DIN 66131.

Open-cell foams (a) may have any desired geometric shapes, e.g. sheets, spheres, cylinders, powders, cubes, flakes, blocks, saddles, bars, or square columns. The size dimensions of foams (a) used as starting material are non-critical. In one embodiment of the present invention, the starting material comprises open-cell foams (a) composed of synthetic organic material, and preferably comprises melamine foams.

Melamine foams particularly suitable as starting material for carrying out the open-cell foams production process are known per se. By way of example, they are produced via foaming of
i) a melamine-formaldehyde precondensate which may contain other carbonyl compounds, such as aldehydes, co-condensed alongside formaldehyde,
ii) one or more blowing agents,
iii) one or more emulsifiers,
iv) one or more hardeners.

Melamine-formaldehyde precondensates i) may be non-derivatized precondensates, or else may be derivatized precondensates, and by way of example up to about 20 mol % of the melamine may have been replaced by other thermoset-forming materials known per se, e.g. alkyl-substituted melamine, urea, urethane, carboxamides, dicyandiamide, guanidine, sulfuryl amide, sulfonamides, aliphatic amines, phenol, and phenol derivatives. Examples of other carbonyl compounds which may be present co-condensed alongside formaldehyde in derivatized melamine-formaldehyde precondensates are acetaldehyde, trimethylolacetaldehyde, acrolein, furfurol, glyoxal, phthalaldehyde and terephthalaldehyde.

Suitable blowing agents ii) are: water, inert gases, in particular carbon dioxide, and physical blowing agents. Physical blowing agents are compounds which are inert toward the starting components and are usually liquid at room temperature and vaporize under the conditions of the urethane reaction. The boiling point of these compounds is preferably below about 110° C., in particular below about 80° C. Among physical blowing agents are also inert gases which are introduced into the starting components i) and ii) or dissolved therein, for example carbon dioxide, nitrogen or noble gases.

Suitable compounds which are liquid at room temperature are usually selected from the group consisting of alkanes and/or cycloalkanes having at least about 4 carbon atoms, dialkyl ethers, esters, ketones, acetals, fluoroalkanes having from about 1 to about 8 carbon atoms and tetraalkylsilanes having from about 1 to about 3 carbon atoms in the alkyl chain, in particular tetramethylsilane.

Examples which may be mentioned are: propane, n-butane, isobutane and cyclobutane, n-pentane, isopentane and cyclopentane, cyclohexane, dimethyl ether, methyl ethyl ether, methyl tert-butyl ether, methyl formate, acetone and fluorinated alkanes which can be degraded in the troposphere and therefore do not damage the ozone layer, e.g. trifluoromethane, difluoromethane, 1,1,1,3,3-pentafluorobutane, 1,1,1,3,3-pentafluoropropane, 1,1,1,2-tetrafluoroethane, 1,1,1-trifluoro-2,2,2-trichloroethane, 1,1,2-trifluoro-1,2,2-trichloroethane, difluoroethanes and heptafluoropropane.

The physical blowing agents mentioned can be used either alone or in any combinations with one another.

The use of perfluoroalkanes for producing fine cells is known from EP-A 0 351 614 (incorporated herein by reference).

Emulsifiers iii) used may be conventional non-ionic, anionic, cationic, or betainic surfactants, in particular about $C_{12}$-$C_{30}$-alkylsulfonates, preferably about $C_{12}$-$C_{18}$-alkylsulfonates, and polyethoxylated about $C_{10}$-$C_{20}$-alkyl alcohols, in particular having the formula $R^1$—O(CH$_2$—CH$_2$—O)$_x$—H, where $R^1$ is selected from about $C_{10}$-$C_{20}$-alkyl and x may be, by way of example, a whole number in the range from about 5 to about 100.

Possible hardeners iv) are, in particular, acidic compounds such as inorganic Brønsted acids, e.g. sulfuric acid or phosphoric acid, organic Brÿnsted acids such as acetic acid or formic acid, Lewis acids and also latent acids.

Examples of suitable melamine foams are described in EP-A 0 017 672 (incorporated herein by refernce).

Open-cell foams (a) may, of course, also comprise additives customary in foam chemistry, for example antioxidants, flame retardants, fillers, colorants such as pigments or dyes, and biocides, such as

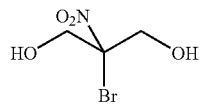

Another starting material used for carrying out the present invention is at least one polymer (b).

The modified open-cell foams herein may be obtained by contacting (bringing into contact) open-cell foams (a) characterized above with at least one polymer (b), in molten or preferably dispersed or emulsified form. Alternatively, open-cell foams are contacted (brought into contact) with at least one non-aqueous solution of polymer (b).

In order to emulsify or disperse polymer (b), polymer (b) can be mixed with, e.g., at least one surface-active ingredient (dispersant or emulsifier) which will subsequently be summarized anionic, cationic or preferably nonionic emulsifiers.

Suitable nonionic emulsifiers are for example ethoxylated mono-, di- and tri-alkylphenols (degree of ethoxylation: about 3- about 50, alkyl radical: about $C_4$-$C_{12}$) and also ethoxylated fatty alcohols (degree of ethoxylation: about 3- about 80; alkyl radical: about $C_8$-$C_{36}$). Commercially available examples are the Lutensol® brands from BASF Aktiengesellschaft and the Triton® brands from Union Carbide.

Suitable anionic emulsifiers are for example alkali metal and ammonium salts of alkyl sulfates (alkyl radical: about $C_8$ to $C_{12}$), of sulfuric acid monoesters formed from ethoxylated alkanols (degree of ethoxylation: about 4- about 30, alkyl radical: about $C_{12}$-$C_{18}$) and from ethoxylated alkylphenols (degree of ethoxylation: about 3- about 50, alkyl radical: about $C_4$-$C_{12}$), of alkylsulfonic acids (alkyl radical: about $C_{12}$-$C_{18}$) and of alkylarylsulfonic acids (alkyl radical: about $C_9$-$C_{18}$) and of sulfosuccinates such as sulfosuccinic mono- and diesters for example.

Suitable cationic emulsifiers are in general $C_6$-$C_{18}$-alkyl-, -aralkyl- or heterocyclyl-containing primary, secondary, tertiary or quaternary ammonium salts, alkanolammonium salts, pyridinium salts, imidazolinium salts, oxazolinium salts, morpholinium salts, thiazolinium salts and also salts of amine oxides, quinolinium salts, isoquinolinium salts, tropylium salts, sulfonium salts and phosphonium salts. By way of example there may be mentioned dodecylammonium acetate or the corresponding hydrochloride, the chlorides or acetates of the various 2-(N,N,N-tri-methylammonium)ethylparaffinic esters, N-cetylpyridinium chloride, N-laurylpyridinium sulfate and also N-cetyl-N,N,N-trimethylammonium bromide, N-dodecyl-N,N,N-trimethylammonium bromide, N,N-distearyl-N,N,N-dimethylammonium chloride and also the gemini surfactant N,N'-(lauryldimethyl)ethylenediamine dibromide. Numerous further examples are to be found in H. Stache, Tensid-Taschenbuch, Carl-Hanser-Verlag, Munich, Vienna, 1981 and in McCutcheon's, *Emulsifiers & Detergents*, MC Publishing Company, Glen Rock, 1989 (both of which are incorporated herein by reference).

Other suitable surface-active ingredients can be, e.g., protective colloids such as starch, polyvinyl alcohol, or modified starch such as oxidized starch.

Self-dispersing polyurethanes can have one or more ionic or ionizable groups per molecule, e.g. sulfonate groups or carboxylic acid groups. To enhance the self-dispersability, said ionizable groups can be neutralized with suitable basic compounds such as basic alkali salts, e.g., sodium hydroxide or potassium hydroxide or sodium carbonate or potassium carbonate, or preferably with tertiary amines such as triethylamine or N,N-di-($C_1$-$C_4$-alkyl)ethanolamine or N,N-($C_1$-$C_4$-alkyl)diethanolamine.

In the pen-cell foams production process herein, open-cell foam (a) is contacted with polymer (b), and polymer (b) may be in molten or preferably dispersed, in particular emulsified, form. It is particularly preferable to use polymer (b) dispersed or emulsified in water.

Examples of ways of bringing about the contact are via immersion of open-cell foam (a) in polymer (b) via saturation of open-cell foam (a) with polymer (b), via preferably complete spraying of open-cell foam (a) with polymer (b), or via application of polymer (b) to open-cell foam (a) by calendering.

If polymer (b) is used as dispersion or emulsion in water, it may be used in the form of aqueous formulations which comprise polymer (b).

Aqueous formulations used according to the invention and comprising polymer (b) preferably comprise from about 0.05 to about 40% by weight, with preference from about 10 to about 35% by weight, of one or more polymers (b), these preferably being in completely or partially neutralized form.

In one alternative of the modified open-cell foam production process herein, aqueous formulations used according to the invention and comprising polymer (b) usually comprise, for the purpose of partial or complete neutralization, one or more substances with basic action, e.g. hydroxides and/or carbonates and/or hydrogencarbonates of alkali metals, or ammonia, or comprise organic amines, such as triethylamine, diethylamine, ethylamine, trimethylamine, dimethylamine, methylamine, ethanolamine, diethanolamine, triethanolamine, methyldiethanolamine, n-butyldiethanolamine, N,N-dimethylethanolamine. Aqueous formulations used according to the invention and comprising polymer (b) preferably comprise a sufficient amount of substance(s) having basic action to have neutralized at least one quarter, preferably at least a half, of the carboxy groups of the polymer(s) (b). Substances having basic action may, by way of example, be added during dispersion or emulsification of polymer (b), to formulations used according to the invention.

In one alternative of the modified open-cell foam production process herein, aqueous formulations used according to the invention and comprising polymer (b) comprise sufficient substance(s) having basic action to neutralize quantitatively the carboxy groups of the polymer(s) (b).

Aqueous formulations used according to the invention and comprising polymer (b) usually have a basic pH value, determined to DIN 19268, for example. pH values of from about 7.5 to about 14 are preferred, and those from about 8 to about 10 are particularly preferred, and those from about 8.5 to about 10 are very particularly preferred.

In one alternative of the modified open-cell foam production process herein, following the contact process, open-cell foam (a) and polymer (b) may permitted to interact, for example over a period in the range from about 1 second to about 24 hours, preferably from about 5 seconds to about 10 hours, and particularly preferably from about 10 seconds to about 6 hours.

In one embodiment of the modified open-cell foams production process, open-cell foam (a) and polymer (b) are brought into contact at temperatures in the range from about 0° C. to about 250° C., preferably from about 5° C. to about 190° C., and particularly preferably from about 10° C. to about 165° C.

In one embodiment of the modified open-cell foams production process, open-cell foam (a) and polymer (b) are first brought into contact at temperatures in the range from about 0° C. to about 50° C., and then the temperature is changed, for example raised to temperatures in the range from about 60° C. to about 250° C., preferably from about 65° C. to about 180° C.

In another embodiment of the modified open-cell foams production process, open-cell foam (a) and polymer (b) are first brought into contact at temperatures in the range from about 0° C. to about 120° C., and then the temperature is changed, for example raised to temperatures in the range from about 30° C. to about 250° C., preferably from about 125° C. to about 200° C.

In one embodiment of the modified open-cell foams production process, open-cell foam (a) will be contacted with a solution of polymer (b) in a non-aqueous solvent. Non-aqueous solvents which may be used, are organic solvents. Examples of suitable organic solvents are aromatic hydrocarbons, such as toluene, ortho-xylene, meta-xylene, para-xylene, ethylbenzene;

aliphatic hydrocarbons, such as n-dodecane, isododecane (2,2,4,6,6-pentamethylheptane), n-tetradecane, n-hexadecane, n-octadecan, and isomers, individually or mixed, of the abovementioned aliphatic hydrocarbons, in particular the mixture available commercially as solvent naphtha, composed of various $C_{12}$-$C_{18}$ hydrocarbons;

ethers, in particular cyclic ethers, such as tetrahydrofuran (THF) and 1,4-dioxane;

mixtures of the abovementioned aliphatic or aromatic hydrocarbons with from about 0.1 to about 10% by weight of alcohols or ethers, e.g. n-hexanol, n-octanol, n-pentanol, tetrahydrofuran, or 1,4-dioxane;

chlorinated hydrocarbons, such as chlorobenzene, ortho-dichlorobenzene, meta-dichlorobenzene.

Suitable concentrations of polymer (b) which is solid at room temperature and which contains carboxy groups and/or which contains carboxylic ester groups in a solvent or mixture of solvents are from about 0.001 to about 75% by weight, preferably from about 0.01 to about 30% by weight, for example.

In one preferred embodiment of the modified open-cell foams production process, the selection of solvent and the temperature profile are such that there is no substantial alteration in most of the structure parameters of open-cell foam (a).

In another preferred embodiment of the present invention, the selection of the amounts of the starting materials—open-cell foam (a), polymer (b), and, if appropriate, additives (c)—is such that inventive foam has markedly higher density than the relevant open-cell foam (a) used as starting material.

In one alternative of the modified open-cell foam production process herein, operations to carry out the modified open-cell foams production process are carried out at atmospheric pressure. In another embodiment of the present invention, operations for carrying out the inventive process are carried out at elevated pressure, for example at pressures in the range from about 1.1 bar to about 10 bar. In another embodiment of the present invention, operations for carrying out the modified open-cell foams production process are carried out at reduced pressure, for example at pressures in the range from about 0.1 mbar to about 900 mbar, preferably up to about 100 mbar.

In one alternative of the modified open-cell foam production process herein, open-cell foam (a) is brought into contact with polymer (b) in such a way that polymer (b) becomes distributed with maximum uniformity in all dimensions over open-cell foam (a). Suitable methods are methods effective for application purposes. Examples which may be mentioned are: complete saturation, immersion, flow coating, drum-application, spray-application, e.g. compressed-air spraying, airless spraying, and high-speed rotary atomization, and also coating, doctor-application, calender-application, spreading, roller-application, wiper-application, and rolling.

In another embodiment of the present invention, open-cell foam (a) is brought into contact with polymer (b) in such a way as to bring about non-uniform distribution of polymer (b) on open-cell foam (a). For example, in one alternative of the modified open-cell foam production process herein open-cell foam (a) may be sprayed non-uniformly with polymer (b) and the materials (a) and (b) may then be allowed to interact. In another embodiment of the present invention, open-cell foam (a) may be incompletely saturated with polymer (b). In another embodiment of the present invention, a part of open-cell foam (a) may be brought into contact once, and another part of open-cell foam (a) may be brought into contact at least twice, with polymer (b). In another embodiment, open-cell foam (a) is saturated and the uppermost layer is rinsed clean with, by way of example, water. The materials are then allowed to interact. The result is coating within the core of open-cell foam (a); the outer surface remains uncoated.

If open-cell foam (a) is brought into contact with polymer (b) in such a way that non-uniform distribution of polymer (b) has been brought about on open-cell foam (a), the effect achieved by, for example, allowing the materials to interact over a period of 2 minutes or more is that not just the outermost layer of open-cell foam (a) is brought into contact with polymer (b).

If open-cell foam (a) is brought into contact with polymer (b) in such a way as to bring about non-uniform distribution of polymer (b) on open-cell foam (a), modified foam may, according to the invention, have mechanical properties that are non-uniform over its cross section. For example, according to the invention it is possible that it is harder at those sites where it has been brought into contact with relatively large proportions of at least one polymer (b) than at those sites where it has been brought into contact with a smaller amount of polymer (b).

In one alternative of the modified open-cell foam production process herein, rinsing may be carried out, for example using one or more solvents, and preferably using water, after contact.

In one alternative of the modified open-cell foam production process herein, after contact and after optional rinsing, drying may be carried out, for example mechanical drying, e.g. via squeezing or calendering, in particular via squeezing through two rollers, or thermally, for example in microwave ovens, hot-air blowers, or drying cabinets, in particular vacuum drying cabinets, the possible temperatures at which drying cabinets are operated being temperatures which are below the softening point or melting point of polymer (b) by from about 25 to about 10° C. In the context of vacuum drying cabinets, vacuum may mean a pressure in the range from about 0.1 to about 850 mbar, for example.

The time taken for any desired drying steps is by definition excluded from the interaction time for the purposes of the present invention.

In one alternative of the modified open-cell foam production process herein, thermal drying may be brought about via heating to temperatures in the range from about 20° C. to about 150° C., for example over a period of from about 10 seconds to about 20 hours. It is preferable to carry out heating to a temperature which is above, by at least about 20° C., the glass transition temperature of polymer (b), preferably to a temperature which is above, by at least about 30° C., the glass transition temperature of polymer (b) used which is solid at room temperature. It is preferable to carry out heating to a temperature which is below the melting or drop point of polymer (b) used, for example below the melting or drop point of polymer (b) used by at least about 5° C.

If a mixture of at least two different polymers (b) has been used, and if thermal drying is desired, heating is carried out to a temperature which is above, by at least about 20° C., preferably at least about 30° C., the glass transition temperature of the higher-glass-transition-temperature polymer (b). If a mixture of at least two different polymers (b) has been used, and if thermal drying is desired, heating is preferably carried out to a temperature which is below the melting point or drop point of all of the polymers (b) used, for example below the melting or drop point of the lowest-melting-point or lowest-drop-point polymer (b), by at least about 5° C.

In order to facilitate the evaporation process, operations may be carried out under reduced pressure, for example at pressures in the range from about 100 to about 990 mbar.

According to the invention, the evaporation residue can then be heat-treated.

In one alternative of the modified open-cell foam production process herein, the evaporation residue may be stored for from about 5 to about 48 hours, preferably from about 12 to about 36 hours, at a temperature in the range from about 45 to about 130° C., preferably from about 60 to about 120° C.

In another embodiment of the present invention, the evaporation residue may be heated in stages. For example, heating may be first carried out to from about 70 to about 90° C., and followed by storage for from about 1 to about 5 hours at from about 70 to about 90° C., and then by heating to from about 110 to about 130° C., and further storage for from about 1 to about 5 hours.

In one alternative of the modified open-cell foam production process herein, at least one open-cell foam (a) may not only be brought into contact with at least one polymer (b), but may also be brought into contact with at least additive (c) (or a combination thereof) selected from:

biocides, such as silver particles or monomeric or polymeric organic biocides, such as phenoxyethanol, phenoxypropanol, glyoxal, thiadiazines, 2,4-dichlorobenzyl alcohols, and preferably isothiazolone derivatives, such as MIT (2-methyl-3(2H)-isothiazolone), CMIT (5-chloro-2-methyl-3(2H)-isothiazolone), CIT (5-chloro-3(2H)-isothiazolone), BIT (1,2-benzoisothiazol-3(2H)-one), and also copolymers of N,N-di-$C_1$-$C_{10}$-alkyl-ω-amino-$C_2$-$C_4$-alkyl (meth)acrylate, in particular copolymers of ethylene with N,N-dimethyl-2-aminoethyl (meth)acrylate;

solids, e.g. abrasive materials or fillers which may be inorganic or organic materials, e.g. sand, lime ($CaCO_3$), silicates with an average particle diameter (number-average) in the range from about 1 μm to about 1 mm, or colloidal silica, preferably inorganic material are selected from oxides, chlorides, sulfates, phosphates, carbonates of Mg, Mn, Ba, Ca, W, Zr, Ti, Si, Mo, in particular $TiO_2$, $SiO_2$, sand and $Al_2O_3$. Other suitable materials are insoluble sodium polymetaphosphate, hydrated alumina, dicalcium orthophosphate dihydrate, calcium pyrophosphate, tricalcium phosphate, calcium polymetaphosphate. Other abrasive material may be Carbon based materials: i.e.: as refered as black carbon, activated carbon, charcoal, etc. and may be porous or not. Particularly preferred inorganic fillers are selected from zeolite based materials and silica based materials. Suitable zeolite based materials are described in the following reference texts: ZEOLITE SYNTHESIS, ACS Symposium Series 398, Eds. M. L. Occelli and H. E. Robson (1989) pages 2-7; ZEOLITE MOLECULAR SIEVES, Structure, Chemistry and Use, by D. W. Breck, John Wiley b Sons (1974) pages 245-250, 313-314 and 348-352 (all of which are incorporated herein by reference). $SiO_2$ exists in a variety of crystalline forms and amorphous modifications, any of which are suitable for use herein. In particular, silicas having a high surface area or in agglomerated forms are preferred (i.e., clays or shells). Without being restrictive to a family of silica based materials, commonly silica which is in a highly purified form such that is contains at least about 90%, preferably about 95%, more preferably about 99% silicon dioxide (i.e.: a silica gel having a about 100% silica content, and fumed silica) is preferred. Alternatively, silica based materials may be provided from other sources such as metal silicates including sodium silicate. Further suitable materials are water-insoluble sodium polymetaphosphate, hydrated alumina, dicalcium orthophosphate dihydrate, calcium pyrophosphate, tricalcium phosphate, calcium polymetaphosphate.

Particularly preferred organic materials are polymers which may be thermoplastic polymeric materials. Suitable thermoplastic polymeric materials for use in the present invention are selected from the group consisting of polyolefins, polyesters, polyvinyl chlorides, polyamides, mixtures thereof and copolymers thereof. Specific examples of polymeric materials include but are not limited to polypropylene, polyethylene, polybutylene, polystyrene, polyethylene terephthalate, polyamide, polyacrylate, polyvinyl chloride, polyvinyl alcohol, ethylene vinyl acetate copolymers and mixtures thereof. Polymers may be in bead shape or randomly shaped. In the context of the present invention, bead-shaped polypropylene is particularly preferred. Additionally, resinous abrasive materials such as particulate condensation products of urea and formaldehyde. Another class of abrasives for use in the present compositions is the particulate thermosetting polymerized resins as described in U.S. Pat. No. 3,070,510 issued to Cooley & Grabenstetter on Dec. 25, 1962 (incorporated herein by reference). Suitable resins include, for example, melamines, phenolics, ureas, melamine-ureas, melamine-formaldehydes, urea-formaldehyde, melamine-urea-formaldehydes, cross-linked epoxy.

Further examples for suitable additives are:

one or more surfactants, which may be anionic, cationic, or non-ionic;

dissolved materials as constituents of polymer (b); carbon based materials such as carbon black, activated carbon, charcoal, activated or non-activated, and may be porous or not;

colorants, such as dyes or pigments;

lubricants, such as silicone oils and siloxane, mineral and plant or animal oils and low friction polymer such as fluorinated polymers;

cross-linkers, such as ionotropic cross-linkers and covalent cross-linkers, examples for ionotropic cross-linkers being charged minerals, charged silica, charged zeolite, charged hectorite, polyvalent cations, polyanions or/and polycations derived from Al, Cu, Zr; examples for covalent cross-linkers are organic molecules with at least two preferably non-conjugated C—C double bonds such as bis(meth)acrylates, tris(meth)acrylates, bis(meth)acrylamides, divinylethers, diallyl ethers, triallyl ethers, in particular N,N'-methylene bisacrylamide, ethylene glycol di(meth)acrylate, polyethylenglykol di(meth)acrylate derived from polyethylene glycol with a molecular weight $M_w$ in the range from about 106 to about 2,000 g/mol, propylene glycol di(meth)acrylate, 1,4-butandiol di(meth)acrylate, 1,6-hexandiol di(meth)acrylate, 1,1,1-trimethylol propane tri(meth)acrylate, di- and trimesters of polyalcohols such as triols, tetraols, and polyols, diallylphthalate, divinylbenzene;

fragrances, e.g. perfume;

plasticizers such as polyesters which are liquid at room temperature, pentaerythrit tetrabenzoate, sugar esters such as sucrose benzoate, aromatic sulfonamides which are solids at room temperature such as ortho- and para-toluenesulfonamide, castor oil and castor oil derivatives, polyethylene glycol with a molecular weight $M_w$ in the range from about 106 to about 6,000 g/mol, reduced sugar such as sorbitol, monocarboxylic about $C_8$-$C_{22}$-fatty acids and their derivatives;

odor scavengers, such as cyclodextrins; and microcapsules charged with at least one active ingredient, such as treatment oil, with one or more biocides, perfume, or odor scavenger, and for the purposes of the present invention the microcapsules may be, by way of example, spherical hollow particles with an average external diameter in the range from about 1 to about 100 µm, which may be composed, by way of example, of melamine-formaldehyde resin or of polymethyl methacrylate.

An example of a procedure for this purpose brings at least one open-cell foam (a) into contact, in different operations or preferably simultaneously, with at least one polymer (b) and with at least additive (c).

In one alternative of the modified open-cell foam production process herein, one or more additives (c) may be added, for example in proportions of from 0 to a total of about 50% by weight, based on polymer (b), preferably from about 0.001 to about 30% by weight, particularly preferably from about 0.01 to about 25% by weight, very particularly preferably from about 0.1 to about 20% by weight, to aqueous formulation used according to the invention and comprising polymer (b).

In one alternative of the modified open-cell foam production process herein, inventive modified foams or foams produced by the modified open-cell foam production process herein are in essence open-cell foams, i.e. foams in which at least about 50% of all lamellae are open, preferably from about 60 to about 100%, and particularly preferably from about 65 to about 99.8%, determined to DIN ISO 4590.

The modified foams herein when used for cleaning purposes or as cleaning implements have an advantageous range of properties. In particular surfaces which are supposed to exhibit glossy appearance can be cleaned quite easily without leaving any scratches. Furthermore, they have improved cleaning power or cleaning action, good resistance to hydrolysis, improved resistance to acid. In particular, cleaning implements according to the present invention as well as the cleaning methods herein show excellent cleaning of greasy soap scum soils and neat kitchen dirt from hard surfaces and at the same time shows excellent durability upon use. Furthermore, soiling of the foams proceeds very slowly. Cleaning implements based on the modified open-cell foams herein, which may have become soiled can readily be cleaned without irreversible damage.

Additional Material

The additional layer(s) optionally present in the cleaning implements herein, may be of any suitable material other than said modified open-cell. The additional material may be suitable to provide beneficial features to the cleaning implement, such as abrasiveness or increased rigidity or increased grip.

In view thereof, said additional material may be a scouring material or a scouring pad, foam material, a rigid foam material, a handle made of a foam material, thermoplastic material, wood, metal or combinations thereof, and the like.

Second Foam

In a highly preferred embodiment herein, the cleaning implement (1) herein comprises (at least) one layer of a second foam (3).

Suitable second foams for use herein are selected from the group of foams consisting of polyurethane foams; polypropylene foams; polyethylene foams; cellulose foam sponges; naturally occurring sponges; open-cell polyester foams; and cross-linked polyethylene foams; and combinations thereof.

The thickness of said layer of a second foam if any is preferably up to about 30 mm, preferably from about 0.5 mm to about 20 mm, more preferably from about 1 mm to about 15 mm, even more preferably from about 2 mm to about 10 mm, and most preferably from about 4 mm to about 8 mm. Furthermore, in the preferred embodiment herein, wherein the cleaning implement comprises a layer of a second foam the thickness of said modified open-cell foam (2) layer is preferably from about 7 mm to about 100 mm, more preferably from about 15 mm to about 25 mm.

In a preferred embodiment herein, the total volume of said layer of said second foam in the cleaning implement herein is preferably from about 10 $cm^3$ to about 100 $cm^3$, more preferably from about 20 $cm^3$ to about 70 $cm^3$, even more preferably from about 30 $cm^3$ to about 60 $cm^3$, and most preferably from about 40 $cm^3$ to about 50 $cm^3$.

Packaging Means

The cleaning implement herein may be combined in an article of manufacture with a packaging means.

The packaging means herein may be any suitable means known to package cleaning implements. Indeed, particularly suitable packaging means herein are selected from the group consisting of: paper bags, plastic bags, cartons, carton boxes, flow wraps, plastic wraps, and paper wraps, and the like and combinations thereof.

The packaging means herein may be printed and/or modified. In particular, such printing and/or other modification may be used to associate a brand-name and/or logo of a hard surface cleaner with said cleaning implement.

Method of Cleaning a Hard Surface

In another embodiment the present invention encompasses method of cleaning a hard surface with a cleaning implement as described herein above.

In yet another embodiment herein, the present invention encompasses a method of cleaning a hard surface by bringing a cleaning implement according to the present invention into contact with said hard surface. By "cleaning" it is meant herein removing spots and/or stains from hard surfaces.

In still another embodiment herein, the present invention encompasses a method of cleaning a hard surface with a modified open-cell foam according to the present invention.

Suitable hard surfaces herein are tiles, walls, floors, sanitary fittings such as sinks, showers, shower curtains, wash basins, WCs, household appliances including, but not limited to, refrigerators, freezers, washing machines, automatic dryers, ovens, microwave ovens, dishwashers and so on.

The methods of cleaning a hard surface according to the present invention may additionally include the step of wetting said cleaning implement or said modified open-cell foam with an appropriate solvent, preferably tap water, more preferably water in combination with a detergent composition, prior to bringing said cleaning implement into contact with said hard surface.

EXAMPLES

The following examples will further illustrate the present invention. The following Examples are meant to exemplify compositions according to the present invention but are not necessarily used to limit or otherwise define the scope of the present invention.

I. Production, in dispersed form, of a polymer (b.1) which is solid at room temperature and which contains carboxy groups and/or which contains carboxylic ester groups Abbreviations: DBTL: Dibutyl tin dilaurate, HMDI:4,4'-diisocyanatocyclohexyl methane, IPDI: isophorone diisocyanate, DETA: diethylentriamine, IPDA: isophoron diamine I.1 Synthesis of Polyurethane (b.1)

A flask with stirrer was charged with 400 g (0.2 mol) of a polyesterdiol (hydroxyl number 56 mg KOH/g according to DIN 53240) made by condensation from adipic acid, neopentyl glycol and 1,6-hexandiol, 30 g (0.0084 mol) mono n-$C_4H_9$-capped polyethylenglycol (hydroxyl number 15 mg KOH/g), 0.15 g DBTL, and 30 g acetone. The resultant mixture was heated to 70° C. (reflux) under continuous stirring. Then, 129 g (0.49 mole) HMDI and 110 g (0.495 mol) IPDI were added, and stirring was continued at 70° C. for one hour. After that, 54 g (0.6 mol) 1,4-butandiol were added and stirring at 70° C. was continued for 2 hours. Then, the mixture was diluted with 710 ml of acetone, the mixture was cooled down to 50° C., and the NCO-contents were determined: 1.02% by weight (calc.: 1.02% by weight). An amount of 25.3 g of a 50% by weight aqueous solution of 2-aminoethyl 2-aminoethanesulfonic acid was added. Ten minutes later, an amount of 870 g of water was added to disperse the polyurethane formed so far, and 6.5 g DETA and 2.4 g IPDA, dissolved in 100 ml water were added as crosslinkers and chain extenders.

The acetone was removed by distillation under reduced pressure, and a 40% by weight solids content aqueous dispersion of polyurethane (b.1) was obtained.

I.2 Synthesis of Polyurethane (b.2)

A flask with stirrer was charged with 800 g (0.4 mol) of a polyesterdiol (hydroxyl number 56 mg KOH/g according to DIN 53240) made by condensation of isophthalic acid, adipic acid and 1,6-hexanediol, 80.4 g (0.6 mol) 1,1-dihydroxymethyl propionic acid, and 36 g 1,4-butandiol. The resultant mixture was heated to 105° C. under continuous stirring. Then, 400 g (1.8 mol) IPDI and 160 g acetone were added. After four hours of continuous stirring at 105° C., 1,600 g of acetone were added and the resultant mixture was cooled to 45° C. The NCO contents were determined, 1.11% by weight (calc.: 1.08% by weight).

Then, 68 g (0.4 mol) of IPDA were added and stirring was continued for 90 minutes. After said 90 minutes, 50 g (0.73 mol) of 25% by weight aqueous ammonia were added and the resultant polyurethane was dispersed in 3 kg of water. The acetone was distilled of under reduced pressure, and a 30% by weight solids content aqueous dispersion of polyurethane (b.2) was obtained.

I.3 Synthesis of Polyurethane (b.3)

A flask with stirrer was charged with 400 g (0.2 mol) of a polyesterdiol (hydroxyl number 56 mg KOH/g according to DIN 53240) made by condensation from adipic acid, neopentyl glycol and 1,6-hexandiol. The polyesterdiol was heated to 130° C. under vacuum (55 mbar) for 30 minutes. Then, the polyesterdiol was allowed to cool to room temperature. It was dissolved in 200 g of acetone and then mixed with 40.5 g of 1,4-butandiol. Then, 69.7 g of a mixture of isomers of toluylene diisocyanate (isomer ratio 2,4/2,6:4:1) were added and additional 33.6 g of hexamethylene diisocyanate. As a catalyst, 0.02 g of DBTL were added. The resultant mixture was heated to 60° C. and stirred at 60° C. over a period of 60° C. Then, an amount of 300 g acetone was added and the mixture was cooled to room temperature. A 40% by weight aqueous solution (19.3 g) of the sodium salt of N-(2-aminoethyl)-2-aminoethanecarboxylic acid was added and stirring was continued. After 20 minutes, 800 ml of water were added dropwisely. Then, the acetone was distilled of under reduced pressure.

A 40% by weight solids content aqueous dispersion of polyurethane (b.3) was obtained.

II. Production of an Inventive Modified Foam

II.1 Production of Unmodified Open-Cell Foam (a.1)

A spray-dried melamine-formaldehyde precondensate (molar ratio 1:3, molecular weight about 500) was added, in an open vessel, to an aqueous solution with 3% by weight of formic acid and 1.5% of the sodium salt of a mixture of alkylsulfonates having from 12 to 18 carbon atoms in the alkyl radical and (K 30 emulsifier from Bayer AG), the percentages being based on the melamine-formaldehyde precondensate. The concentration of the melamine-formaldehyde precondensate, based on the entire mixture composed of melamine-formaldehyde precondensate and water, was 74%. The resultant mixture was vigorously stirred, and then 20% of n-pentane were added. Stirring was continued (for about 3 min) until a dispersion of homogeneous appearance was produced. This was applied, using a doctor, onto a Teflon-treated glass fabric as substrate material and foamed and cured in a drying cabinet in which the prevailing air temperature was 150° C. The resultant temperature within the foam composition was the boiling point of n-pentane, which was 37.0° C. under these conditions. After from 7 to 8 min, the foam had risen to its maximum height. The foam was then left for a further 10 min at 150° C. in the drying cabinet; it was then heat-conditioned for 30 min at 180° C. This gave unmodified foam (a.1).

II.2 Production of Inventive Modified Foams F1 to F3

The following properties were determined on the unmodified foam (a.1) from Inventive Example II.1:

open-cell factor to DIN ISO 4590: 99.6%, compressive strength (40%): 1.3 kPa, determined to DIN 53577, density: 10.0 kg/$m^3$, determined to EN ISO 845, average pore diameter: 210 µm, determined via evaluation of micrographs of sections, BET surface area: 6.4 $m^2$/g, determined to DIN 66131, sound absorption: 93%, determined to DIN 52215, sound absorption: more than 0.9, determined to DIN 52212.

Unmodified foam (a.1) from Inventive Example II.1 was cut into foam blocks with dimensions 12.5 cm·6.5 cm·4 cm. The weight of the foam blocks was 2 g each.

II.2.1 Manufacture of Inventive Foam F1

One foam block from II.1 was brought into contact with aqueous dispersion D1, by dipping the foam block completely into aqueous dispersion D1 and allowing it to remain covered by aqueous dispersion D1 for 5 seconds. The soaked foam block was then removed from the respective aqueous dispersion and excess aqueous dispersion was removed by squeezing, by passing the soaked foam block between counter-rotating rolls having a diameter of 150 mm and a separation of 5 mm and rotating at a speed of 32 rpm with a pressure of 0.5 bar.

The material obtained had a total weight of 32 g. It was then dried for a period of 18 hours at 110° C. in a drying cabinet. This gave inventive modified foam F1.

II.2.2 Manufacture of Inventive Foam F2

One foam block from II.1 was brought into contact with aqueous dispersion D2, by dipping the foam block completely into aqueous dispersion D2 and allowing it to remain covered by aqueous dispersion D2 for 5 seconds. The soaked foam block was then removed from the respective aqueous dispersion and excess aqueous dispersion was removed by squeezing, by passing the soaked foam block between counter-rotating rolls having a diameter of 150 mm and a separation of 5 mm and rotating at a speed of 32 rpm with a pressure of 0.75 bar.

The material obtained had a total weight of 26 g. It was then dried for a period of 18 hours at 110° C. in a drying cabinet. This gave inventive modified foam F2.

II.2.3 Manufacture of Inventive Foam F3

One foam block from II.1 was brought into contact with aqueous dispersion D3, by dipping the foam block completely into aqueous dispersion D3 and allowing it to remain covered by aqueous dispersion D3 for 5 seconds. The soaked foam block was then removed from the respective aqueous dispersion and excess aqueous dispersion was removed by squeezing, by passing the soaked foam block between counter-rotating rolls having a diameter of 150 mm and a separation of 5 mm and rotating at a speed of 32 rpm with a pressure of 0.5 to 0.75 bar.

The material obtained had a total weight of 28 g. It was then dried for a period of 18 hours at 110° C. in a drying cabinet. This gave inventive modified foam F3.

III. Use of Inventive Modified Foams and of Unmodified Foams as Cleaning Implements or to Clean Hard Surfaces III.1 Cleaning Implement A A single layer cleaning implement having a cuboid shape defined by three groups of parallel and equal length sides, referred to as a, b and c, with a being 6.5 cm, b being 12 cm, and c being 3 cm is cut from inventive foam F1. The overall shape of Cleaning Implement A is similar to the cleaning implement of FIG. 1.

Cleaning Implement A is used to clean hard surfaces. Indeed, Cleaning Implement A is wetted with water and thereafter brought into contact with the hard surface to be cleaned. Cleaning Implement A shows an excellent performance in removing greasy soap scum and neat kitchen dirt from said hard surface.

III.1 Cleaning Implement B

A dual layer cleaning implement having a cuboid shape defined by three groups of parallel and equal length sides, referred to as a, b and c, with a being 6.5 cm, b being 12 cm, and c being 4 cm is made by foam flame laminating a first layer of inventive foam F2, having a thickness—side c—of 2 cm to a second layer of commercially available polyurethane foam, having a thickness—side c—of 1 cm. The two layers are joined together at the plane formed by sides a and b. The overall shape of Cleaning Implement B is similar to the cleaning implement of FIG. 2.

Cleaning Implement B is used to clean hard surfaces. Indeed, Cleaning Implement B is wetted with water and thereafter the inventive foam side of Cleaning Implement B is brought into contact with the hard surface to be cleaned by rubbing said side over the area to be cleaned. The excessive amount of water is thereafter absorbed by the polyurethane layer of Cleaning Implement B by swiping the cleaned surface with said layer. Cleaning Implement B shows an excellent performance in removing greasy soap scum and neat kitchen dirt from said hard surface.

III.3 Cleaning Implement C

A dual layer cleaning implement having a cuboid shape defined by three groups of parallel and equal length sides, referred to as a, b and c, with a being 6.5 cm, b being 12.5 cm, and c being 2.5 cm is made by a permanent adhesive a first layer of inventive foam F3, having a thickness—side c—of 2 cm to a second layer of commercially available polyurethane foam, having a thickness—side c—of 0.5 cm. The two layers are joined together at the plane formed by sides a and b. The overall shape of Cleaning Implement C is similar to the cleaning implement of FIG. 2.

Cleaning Implement B is used to clean hard surfaces. Indeed, Cleaning Implement C is wetted with water and thereafter the inventive foam side of Cleaning Implement C is brought into contact with the hard surface to be cleaned by rubbing said side over the area to be cleaned. The excessive amount of water is thereafter absorbed by the polyurethane layer of Cleaning Implement C by swiping the cleaned surface with said layer. Cleaning Implement C shows an excellent performance in removing greasy soap scum and neat kitchen dirt from said hard surface.

III.4 Use of Inventive Foam F1 to Clean a Hard Surface

A piece of Inventive Foam F1 is used to clean a hard surface by wetting a piece of said foam with water and thereafter bringing it into contact with the hard surface to be cleaned. Inventive Foam F1 shows an excellent performance in removing greasy soap scum and neat kitchen dirt from said hard surface.

IV.1 Use of Inventive Modified Foams and of Unmodified Foams as Hard Surface Cleaning Implements such as a Wiper Inventive modified foams and unmodified foam (comparative example) were in each case used as wipers.

Ivory-colored glossy tiles that are contaminated with greasy soap and neat kitchen dirt (grease). Single layer cleaning implements having a cuboid shape defined by three groups of parallel and equal length sides, referred to as a, b and c, with a being 6.5 cm, b being 12 cm, and c being 3 cm are cut from inventive foams F1, F2, and F3. The overall shape of these cleaning implements are similar to the cleaning implement of FIG. 1. Implements based on inventive foams F1, F2, and F3 are each used to clean a glossy tile by wetting a piece of the respective inventive foam with water and thereafter wiping the glossy tiles. Implements based on inventive foams F1, F2, and F3 each show an excellent performance in removing greasy soap scum and neat kitchen dirt from said glossy tiles. Furthermore, no scratches are detected on the tiles by visual inspection.

As a comparative example, a cleaning implement (same shape as used above for implements based on inventive foams F1, F2, and F3) based on unmodified foam (a.1) is used to clean ivory-colored glossy tiles that are contaminated with greasy soap and neat kitchen dirt (grease)—same preparation as used above for implements based on inventive foams F1, F2, and F3—by wetting the implement of the unmodified foam (a.1) with water and thereafter wiping (same force applied as applied above for implements based on inventive foams F1, F2, and F3) the glossy tiles. The neat kitchen dirt and the greasy soap are only partially removed (residues left on the tiles).

When the force applied on the implement is increased (hard, manual scrubbing) the greasy soap scum and neat kitchen dirt is eventually removed completely from said glossy tiles. However, scratches are detected on the formerly glossy tiles and the appearance was less favorable.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

All documents cited in the Detailed Description of the Invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A cleaning implement comprising a modified open-cell foam with a density in the range from about 5 to about 1,000 kg/m3 and with an average pore diameter in the range from about 1 µm to about 1 mm, wherein said modified open-cell foam comprises
    a dried aqueous formulation dispersed in an unmodified open-cell foam, the formulation comprising about 0.05 to about 40% by weight of at least about one water-insoluble polymer, selected from the group consisting of: polystyrenes, styrene copolymers, polybutadienes, butadiene copolymers, polyvinylesters, polyvinylethers, copolymers from (meth)acrylic acid with at least one (meth)acrylate, polyurethanes obtained via reaction of at least one diol and at least one diisocyanate, polyethylene and wax derivatives thereof, polypropylene and wax derivatives thereof, polyethylene-copolymers, polypropylene-copolymers, ethylene-propylene-diene-copolymers and combinations thereof; with the proviso that styrene-acrylonitrile-C1-C10-alkyl (meth) acrylate terpolymers, styrene-butadiene-n-butyl acrylate terpolymers, and styrene-maleic anhydride copolymers are excluded; and the formulation further comprising abrasive particles,
    wherein the unmodified open-cell foam is a melamine foam and is a rigid foam with a compression strength of 1 kPa or above at 40% compression, the unmodified open-cell foam having a core and an outer surface, wherein the cleaning implement is adapted to clean a hard surface, and wherein the formulation is within the core of the unmodified open-cell foam and the outer surface of the unmodified open-cell foam is completely free of formulation.

2. The cleaning implement according to claim 1, wherein said water-insoluble polymer is a polyurethane.

3. The cleaning implement according to claim 1, wherein said melamine foam is a melamine-formaldehyde resin foam.

4. The cleaning implement according to claim 1, wherein said water-insoluble polymer has thermoplastic properties.

5. The cleaning implement according to claim 1, wherein said water-insoluble polymer has elastomeric properties.

6. The cleaning implement according to claim 1, wherein said cleaning implement has a thickness of at least about 15 mm.

7. The cleaning implement according to claim 1, having a shape selected from the group consisting of: cube shape, rectangular shape, pyramid shape, cylindrical shape, cone shape, pencil eraser shape, cuboid shape, and tetrahedron shape.

8. The cleaning implement according to claim 1, having a volume of from about 1 $cm^3$ to about 10,000 $cm^3$.

9. The cleaning implement according to claim 1, wherein said modified open-cell foam forms a first layer and wherein said cleaning implement additionally comprises a second layer of material.

10. The cleaning implement according to claim 9, wherein said second layer of material is a second foam layer.

11. The cleaning implement according to claim 10, wherein said second foam layer consists of: polyurethane foams; polypropylene foams; polyethylene foams; cellulose foam sponges; naturally occurring sponges; open-cell polyester foams; cross-linked polyethylene foams; and combinations thereof.

12. The cleaning implement according to claim 10, wherein said layer of modified open-cell foam and said layer of a second foam are joined by means of a permanent attachment or a temporary attachment.

13. The cleaning implement according to claim 10, wherein said layer of said modified open-cell foam and said layer of a second foam are joined by an attachment means providing a permanent attachment selected from the group consisting of: foam flame laminating the two layers together; use of a permanent adhesive; sewing the two layers together; needle-punching the two layers together; and combinations thereof.

14. The cleaning implement according to claim 9, wherein said cleaning implement further comprises at least one additional layer.

15. The cleaning implement according to claim 1, wherein the thickness of said modified open-cell foam layer is from about 5 mm to about 100 mm.

16. The cleaning implement according to claim 1, wherein said cleaning implement comprises two outer layers of said modified open-cell foam and an inner layer of material.

17. The cleaning implement according to claim 16, wherein said inner layer of material is a second foam material.

18. The cleaning implement according to claim 17, wherein said inner layer of a second foam material is made of a foam material selected from the group consisting of: polyurethane foams; polypropylene foams; polyethylene foams; cellulose foam sponges; naturally occurring sponges; open-cell polyester foams; cross-linked polyethylene foams; and combinations thereof.

19. The cleaning implement according to claim 1, wherein said modified open-cell foam comprises at least one additive selected from the group consisting of: biocides; filler materials; surfactants, colorants, lubricants, crosslinkers, fragrances, plasticizers; odor scavengers; microcapsules; and combinations thereof.

20. A modified open-cell foam cleaning implement comprising:

an open-cell aminoplastic foam, wherein the aminoplastic foam is modified with a formulation which includes abrasive particles and at least one water-insoluble polymer selected from the group consisting of polystyrenes, styrene copolymers, polybutadienes, butadiene copolymers, polyvinylesters, polyvinylethers, copolymers from (meth)acrylic acid with at least one (meth)acrylate, polyurethanes, polyethylene and wax derivatives thereof, polypropylene and wax derivatives thereof, polyethylene-copolymers, polypropylene-copolymers, ethylene-propylene-diene-copolymers, and combinations thereof, excluding styrene-acrylonitrile-C1-C10-alkyl (meth)acrylate terpolymers, styrene-butadiene-n-butyl acrylate terpolymers, and styrene-maleic anhydride copolymers, wherein the aminoplastic foam is a melamine foam and is a rigid foam with a compression strength of 1 kPa or above at 40% compression, the aminoplastic foam having a core and an outer surface, wherein the cleaning implement is adapted to clean a hard surface, and wherein the formulation is within the core of the aminoplastic foam and the outer surface of the aminoplastic foam is completely free of formulation.

* * * * *